Jan. 23, 1962  
J. B. VETRANO  
3,018,169  
METHOD OF MAKING DELTA ZIRCONIUM HYDRIDE  
MONOLITHIC MODERATOR PIECES  
Filed Jan. 7, 1959
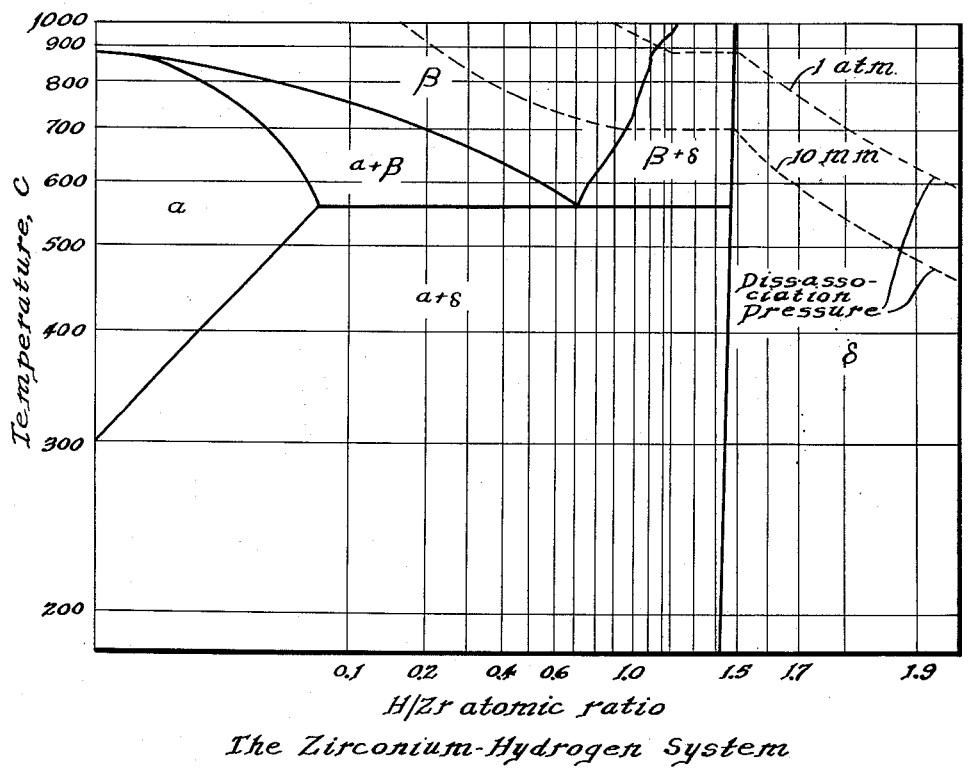
*The Zirconium-Hydrogen System*
INVENTOR.  
*James B. Vetrano*  
BY  
*Roland A. Anderson*  
*Attorney*

3,018,169
METHOD OF MAKING DELTA ZIRCONIUM HYDRIDE MONOLITHIC MODERATOR PIECES
James B. Vetrano, Reseda, Calif., assignor to the United States of America as represented by the United States Atomic Energy Commission
Filed Jan. 7, 1959, Ser. No. 785,542
3 Claims. (Cl. 23—204)

This invention relates to the preparation of large sound bodies of delta-phase zirconium hydride. Delta-phase zirconium hydride has a high number of hydrogen atoms per cubic centimeter and is stable at all temperatures. It is therefore useful as a solid moderator for a nuclear reactor. In this application delta-phase zirconium hydride is defined as all material having a hydrogen-to-zirconium atomic ratio of between 1.5 and 2.0.

Delta-phase zirconium hydride is difficult to prepare in the massive form, because it cracks and powders when the hydrogen is introduced and it cannot be recompacted to a high density. Furthermore, its brittleness at both room temperature and at elevated temperatures makes machining and hot-working nearly impossible.

It is accordingly an object of the present invention to form large, sound bodies of delta-phase zirconium hydride.

This object may be attained by my method which comprises hydriding zirconium metal while retarding the rate of the reaction by limiting the supply of available hydrogen so that steep hydrogen concentration gradients are never established. The supply of available hydrogen is limited by carefully controlling the temperature of the body to be hydrided.

The FIGURE shows a simplified temperature-composition phase diagram for the zirconium-hydrogen system. Other phases are known to exist but the areas of their existence are not known with certainty. The phases shown are those that are important with respect to this invention.

It will be apparent from the phase diagram that delta-phase zirconium hydride is stable at all temperatures and that other forms of zirconium hydride are not stable at all temperatures. Therefore, thermal cycling does not result in dimensional changes in the delta hydride.

It was found that the difficulty of preparation of sound, solid bodies of zirconium hydride occurs during the transformation between beta and delta zirconium hydride. This occurs since the process involves a rearangement from hexagonal close-packed to face-centered tetragonal crystals with an accompanying density change from 6.5 to about 5.5 g./cm.$^3$. The material is therefore subjected to severe internal stressing during the hydriding process. Since delta-phase hydride is relatively brittle, this stress is relieved by fracturing.

The procedure followed generally comprises directly combining zirconium and hydrogen at elevated temperatures. The transformation from zirconium metal to beta-phase zirconium hydride may be carried out rapidly. The transformation from beta phase to delta phase must be carried out very slowly.

Before the metal is hydrided it must be carefully cleaned. Surface preparation thereof is very important since oxide, nitride or grease films will inhibit hydriding. The standard pretreatment required is to lightly abrade the specimens with 120-grit aluminum oxide paper after they have been machined to the proper dimensions. They are then degreased in hexane.

After surface preparation the metal is heated to a temperature high enough so that only a comparatively small proportion of hydrogen is in equilibrium with the metal at the pressure to be used. It can be seen from the phase diagram that at one atmosphere pressure and 1000° C. it is not possible to obtain a composition containing more hydrogen than is indicated by the formula $ZrH_{.9}$. Accordingly, if the metal be heated to a temperature not less than 1000° C. in an atmosphere of hydrogen at a pressure not greater than one atmosphere, beta-phase zirconium hydride having the formula $ZrH_{<1}$ will be obtained. As has already been said, hydriding this far can be and is accomplished relatively fast.

After heating, hydrogen is admitted till the desired pressure is obtained. This pressure is maintained approximately constant by admitting additional hydrogen as the pressure falls due to its reaction with the metal.

The temperature is then reduced slowly to increase slowly the amount of hydrogen in equilibrium with the metal. The rate at which the temperature is reduced depends on the size of the piece of metal to be hydrided, the larger pieces requiring more time for the hydrogen to penetrate and reach equilibrium throughout the piece than do the small pieces. After the temperature has been reduced enough so that the transition to the delta hydride has been accomplished, the temperature may be reduced more rapidly to room temperature. The resulting bodies are sound and contain between 60 and 65 atomic percent hydrogen corresponding to a formula approximating $ZrH_{1.6}$ or $ZrH_{1.7}$.

It will be noted from the phase diagram that the approach to the delta phase is made through the $\beta+\delta$ transition region. This avoids passing through an abrupt transition between the $\beta$ and $\delta$ phases.

A number of experiments were performed to determine the proper conditions for preparing sound bodies of delta zirconium hydride. The procedure followed was to evacuate a system having a one liter capacity, introduce a sample of zirconium thereinto, and heat to 1000° C. Hydrogen was then introduced till a pressure of about 600 mm. of Hg was obtained. Additional hydrogen was introduced whenever the pressure fell below about 500 mm. of Hg until the temperature was dropped to 800° C. to maintain the hydrogen pressure between 500 and 600 mm. of Hg.

The experiments were carried on on zirconium cylindrical rods having a diameter of ¼ inch, ½ inch and 1 inch. For ¼-inch samples, the temperature was reduced 50° an hour until a temperature of 800° C. was reached, while the rate for ½-inch samples was only 5° an hour, and the rate for 1-inch samples 2–3° an hour.

From 800° C. the cooling rates may be increased until room temperature is reached. The sample is held in an atmosphere of hydrogen during this time but additional hydrogen is not admitted. When the sample finally reaches room temperature virtually all the hydrogen is gone. However, the rate of cooling at this time is not of critical importance. The rate of cooling was not increased for the ¼-inch samples but was increased to 13° per hour for the ½- and 1-inch samples. The samples thus prepared were free of cracks and were of the approximate formula $ZrH_{1.6}$. This is a higher proportion of hydrogen than had been found possible heretofore to introduce into zirconium hydride while retaining the massive form.

It is apparent from the above that the rate at which the hydrogen can be added depends on the size of the body to be hydrided. It has been determined that the relation between hydriding time ($t$) in hours and the diameter of the specimen (D) in inches for cylindrical rods is given by the formula $$t = -154.7D^2 + 316D - 65.3$$

Hydriding time is defined as the time the hydrogen pressure is maintained above 500 mm. of Hg. It does not include cooling time in an atmosphere of hydrogen. In the above examples, hydriding time is the time within which the temperature is reduced from 1000° C. to 800° C. Similar relationships can be derived experimentally for other bodies.

How important it is to extend the hydriding over a long time is shown by the fact that no samples hydrided for a time approximating that given by the equation cracked, while two ½-inch samples cracked when hydrided within 25 to 27 hours and two 1-inch samples hydrided within 75 to 77 hours cracked.

It will be understood that this invention is not to be limited to the details given herein but that it may be modified within the scope of the appended claims.

What is claimed is:

1. A method of preparing sound, shaped bodies of delta zirconium hydride comprising heating a zirconium body of the desired shape to not less than 1000° C., providing an atmosphere consisting of hydrogen around the bodies at a pressure of 500 to 600 mm. of Hg to form beta zirconium hydride, reducing the temperature at a rate not greater than 50 degrees per hour to 800° C., the rate of reduction being such that cracks do not form in the zirconium body, the hydrogen pressure being maintained at 500 to 600 mm. of Hg, whereby transformation from the beta phase to the delta phase occurs, and cooling to room temperature in an atmosphere of hydrogen without adding additional hydrogen.

2. A method of preparing sound, cylindrical bodies of delta zirconium hydride comprising heating a cylinder of zirconium to 1000° C., providing an atmosphere consisting of hydrogen around the bodies at a pressure of 500 to 600 mm. of Hg to form beta zirconium hydride, reducing the temperature slowly to 800° C. in accordance with the equation $$t = -154.7D^2 + 316D - 65.3$$

where $t$ is the time of hydriding in hours, and D is the diameter of the cylinder in inches, while maintaining a hydrogen pressure of 500 to 600 mm. of Hg, whereby transformation from beta to delta zirconium hydride occurs, and cooling to room temperature in an atmosphere of hydrogen without adding additional hydrogen.

3. A method of preparing large, sound shaped bodies of delta zirconium hydride comprising heating a zirconium body of the desired shape and size to a temperature of not less than 1000° C., providing an atmosphere consisting of hydrogen around the zirconium bodies at a pressure not greater than one atmosphere to form beta zirconium hydride, reducing the temperature slowly to 800° C. at a rate inversely related to the size of the body to be hydrided such that cracks do not form in the body while maintaining the hydrogen pressure within a limited pressure range below but in the vicinity of one atmosphere whereby transformation from the beta phase to the delta phase occurs, and cooling to room temperature in an atmosphere of hydrogen without adding additional hydrogen.

References Cited in the file of this patent

Edwards et al.: J.A.C.S., vol. 77, pp. 1307–11, Mar. 5, 1955.

E. T. Hayes et al.: Journal of the Electrochemical Society, vol. 97, No. 10, 1950, pp. 316–323.